US010618439B2

(12) United States Patent
Durkee et al.

(10) Patent No.: US 10,618,439 B2
(45) Date of Patent: Apr. 14, 2020

(54) OCCUPANT ARMREST

(71) Applicant: Faurecia Automotive Seating, LLC, Auburn Hills, MI (US)

(72) Inventors: Chad W. Durkee, Troy, MI (US); Shaun D. Tait, Troy, MI (US); Charles J. Cauchy, Traverse City, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 167 days.

(21) Appl. No.: 15/942,991

(22) Filed: Apr. 2, 2018

(65) Prior Publication Data

US 2018/0281641 A1 Oct. 4, 2018

Related U.S. Application Data

(60) Provisional application No. 62/481,372, filed on Apr. 4, 2017.

(51) Int. Cl.
*B60N 2/56* (2006.01)
*B60N 2/75* (2018.01)

(52) U.S. Cl.
CPC ......... *B60N 2/5685* (2013.01); *B60N 2/5692* (2013.01); *B60N 2/75* (2018.02); *B60N 2/78* (2018.02)

(58) Field of Classification Search
CPC ...... B60N 2/5685; B60N 2/75; B60N 2/5692; B60N 2/78; F25B 21/04; H01L 35/30; H01L 35/28; H01L 25/32
See application file for complete search history.

(56) References Cited

U.S. PATENT DOCUMENTS

| 8,439,437 B2 | 5/2013 | Akai |
| 8,944,500 B2 | 2/2015 | Oh |
| 9,028,137 B2 | 5/2015 | Sjölund |
| 2007/0158981 A1* | 7/2007 | Almasi ............ A47C 7/74 297/180.12 |
| 2015/0048658 A1 | 2/2015 | Gawade |
| 2015/0102024 A1* | 4/2015 | Barfuss .......... B62D 1/046 219/204 |

FOREIGN PATENT DOCUMENTS

| DE | 10130826 C2 | 1/2003 |
| DE | 203140831 U1 | 12/2003 |
| JP | 8014724 A | 1/1996 |
| KR | 20070014670 A | 2/2007 |
| WO | 2017027067 | 2/2017 |

OTHER PUBLICATIONS

European Search Report and Written Opinion for EP18165365, dated Aug. 15, 2018, 4192 EP, 5 pages.

* cited by examiner

*Primary Examiner* — Melvin Jones
(74) *Attorney, Agent, or Firm* — Barnes & Thornburg LLP

(57) ABSTRACT

An occupant armrest is configured for use in a vehicle. The occupant armrest includes a substrate, a cover, and a thermoelectric module. The substrate is configured to support an arm of an occupant of the vehicle. The cover is arranged around the substrate. The thermoelectric module is configured to provide at least one of heating and cooling the arm of the occupant.

20 Claims, 4 Drawing Sheets

OCCUPANT ARMREST

PRIORITY CLAIM

This application claims priority under 35 U.S.C. § 119(e) to U.S. Provisional Application No. 62/481,372, filed Apr. 4, 2017, which is expressly incorporated by reference herein.

BACKGROUND

The present disclosure relates to use of an occupant support, and particularly use of an occupant support in a vehicle. More particularly, the present disclosure relates to use of an arm support in a vehicle while an occupant is using a vehicle seat.

SUMMARY

A vehicle includes a vehicle seat and an armrest. The vehicle seat includes a seat bottom and a seat back. The seat bottom is coupled to a floor of a vehicle to move relative to the floor. The seat back is coupled to the seat bottom to extend upwardly away from the seat bottom and move relative to the seat bottom. The armrest is located proximate the seat bottom and seat back and configured to support an arm of the occupant.

According to the present disclosure, the armrest may or may not be included in the vehicle seat. In some embodiments, the armrest is coupled to the seat back for movement therewith. In another example, the armrest is attached or integrated into a center console or to a door of the vehicle.

In illustrative embodiments, the armrest may maximize comfort experienced by an occupant resting on the vehicle seat. The armrest enables the occupant to have personal climate control. The thermal armrest may generate heat or cooling based on the temperature sensed by the occupant while the armrest is in use.

In some embodiments, the thermal armrest may comprise one or more thermoelectric modules. Two or more thermoelectric modules may be connected and arranged either in series or in parallel with respect to one another. The two or more modules may be described as at least one thermoelectric module array.

In some embodiments, the one or more thermoelectric modules may be used in combination with a blower fan and heat sink. Other embodiments may include a single thermoelectric module, one or more fans, and one or more heat sinks. Two or more heat sinks may be connected and arranged either in series or in parallel with respect to one another, the two or more heat sinks described as at least one heat sink array.

In illustrative embodiments, one or more heat sinks are capable of being packaged within an armrest tunnel formed in an armrest. Embodiments may include carbon-based material, such as graphene sheets or strips. A plastic overlay in addition to fabric may be included in the armrest assembly. Various thermoelectric powering schemes may be used to achieve desired temperature uniformity across the heated or cooled surface of the armrest. A temperature control system includes a heating mode and switch for cool, off, and heat operation.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
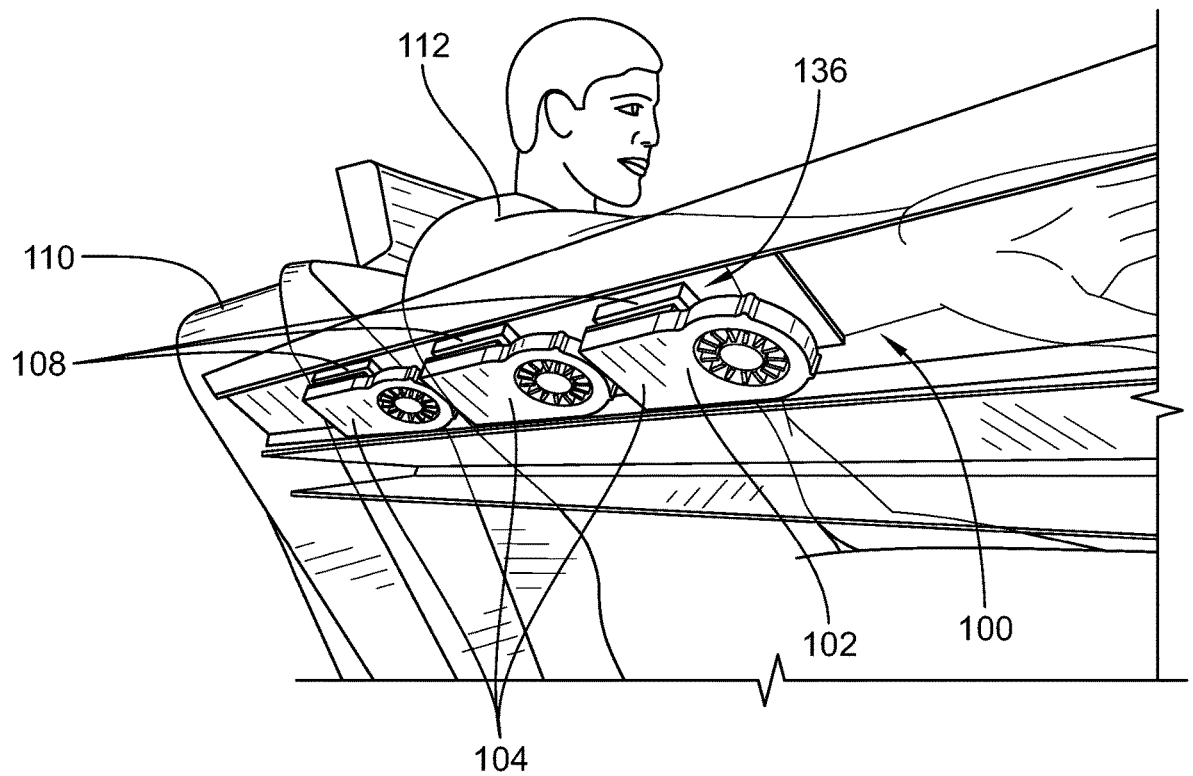
FIG. 1 is a perspective view showing an occupant resting their arm on an occupant armrest in accordance with the present disclosure.

As shown in FIG. 1, the occupant armrest 100 comprises at least one thermoelectric unit 136 for providing heating and cooling to an arm of an occupant 112 supported on an armrest 100 in a vehicle. The thermoelectric unit 136 includes at least one thermoelectric module 102. The at least one thermoelectric module 102 may comprise two or more thermoelectric modules 102 to form a thermoelectric module array 104. Reference is hereby made to U.S. Application Publication No. 2016/0039321, filed Aug. 6, 2015 for disclosure relating to thermoelectric modules in accordance with the present disclosure, the application being hereby incorporated by reference in its entirety herein. Thermoelectric modules 102 may include, for example, Peltier-effect elements.

Each thermoelectric unit 136 may comprise generally its own heat sink 106. When more than one thermoelectric module 102 is provided, two or more heat sinks 106 may be provided. The at least one heat sink 106 may comprise two or more heat sinks 106 to form a heat sink array 108. The thermoelectric modules 102 of thermoelectric module array 104 and the heat sinks 106 of heat sink array 108 may be connected to one another in series or in parallel, respectively. Similarly, thermoelectric modules 102 of thermoelectric module array 104 and the heat sinks 106 of heat sink array 108 may be arranged in series or in parallel with respect to the armrest tunnel 130.

When occupant 112 rests in vehicle seat 110, occupant 112 may have direct contact with armrest trim and cover material 116. The occupant 112 may control the temperature of one or more surfaces of the occupant armrest 100 via temperature control switch 124. The temperature control system 122 comprises a temperature control switch 124 to operate temperature control circuitry, in a wired or wireless manner, connected to the temperature control interface 128 with which the occupant 112 interacts. Temperature control interface 128 may be any type of display or touch screen for interaction with the occupant armrest control system 122.

The thermoelectric module 102 operates by creating a difference in temperature by transferring heat between two electrical junctions. When current flows through the junctions of two conductors, heat is removed at one junction and cooling is achieved. The Peltier effect acts consistently with the position of control switch 124 in order to cool, heat, or otherwise be disengaged. The switch 124 is shown, for example, in FIG. 10 as a manual toggle switch. However, switch 124 may be any type of switch, without regard to whether the switch is manual, semi-automatic, or fully automatic.

The temperature control system 122 operates using a temperature sensor as an input. The input will be compared with the desired temperature, the desired temperature manually provided or automatically programmed by instructions as part of temperature control circuitry 126. The temperature control circuitry 126 then provides an output to the control system 122 to operate to heat, cool, or remain disengaged in the off position.

In cooling mode, the control switch 124 is engaged to send power to the thermoelectric modules 102. With reference to FIG. 1, the top sides of the thermoelectric modules 102 decrease in temperature due to the Peltier effect. The bottom side increases in temperature and disperses the temperature change through the heat sinks 106. A fan 144 that may be integral to the thermoelectric module 102 blows across the heat sink to dissipate heat from the heat sink.

The cooling temperature from the top of the thermoelectric module 102 transfers to the conductive layer 118, such as graphene, which spreads the temperature change across the armrest surface. The metallic or aluminum sheet 114 is cooled, thereby transferred the temperature difference to the surface that the cloth or leather armrest is directly in contact with.

In heating mode, the control switch 124 is engaged to send power to the thermoelectric modules 102 using reverse polarity of the cooling mode. With reference to FIG. 1, the top sides of the thermoelectric modules 102 decrease in temperature and disperse the temperature change through the heat sinks 106.

The heat is transferred to the conductive layer 118, such as graphene, which spreads the temperature across the armrest surface. The metallic or aluminum sheet 114 is heated, transferring the temperature difference to the surface that the cloth or leather armrest is directly in contact with. A thermistor is used to monitor and regulate the heat of the surface by turning the system off if the surface temperature exceeds a predetermined threshold.

Figure 2:
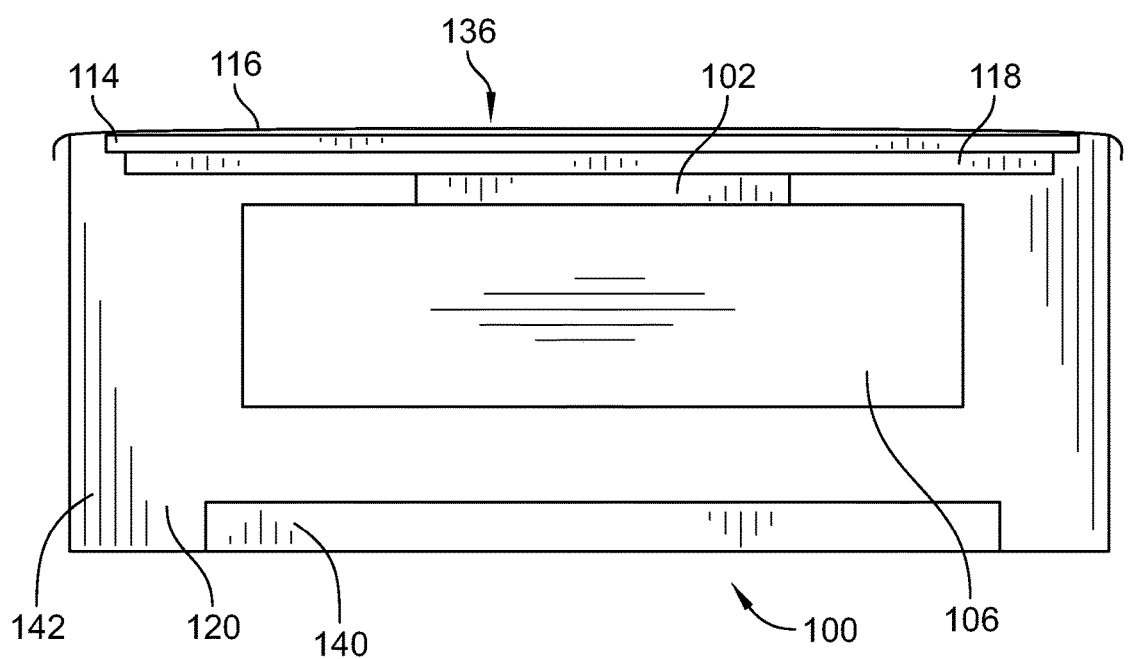
FIG. 2 is a diagrammatic view of an occupant armrest in accordance with the present disclosure.
Figure 3:
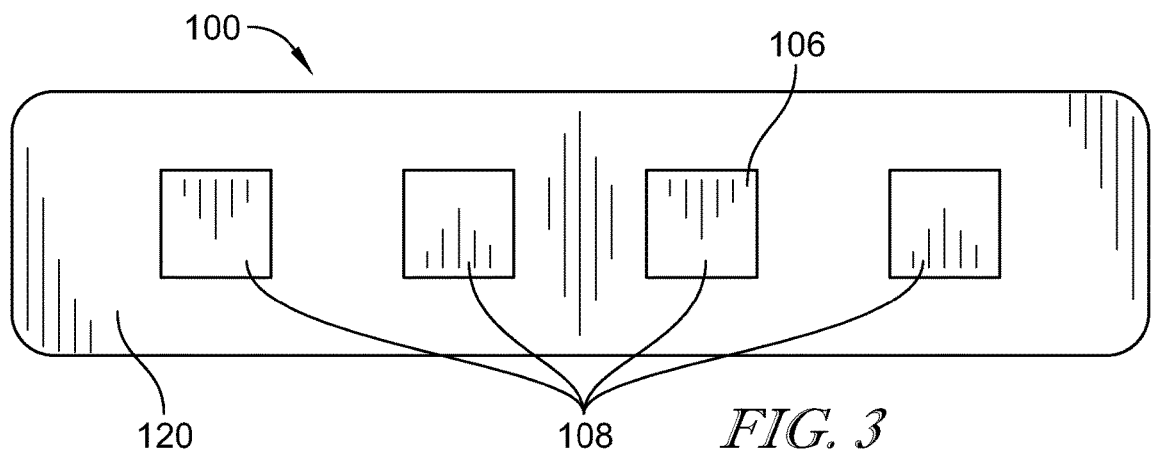
FIG. 3 is a diagrammatic top view of thermoelectric module locations with respect to an armrest substrate of the armrest of FIG. 2.
Figure 4:
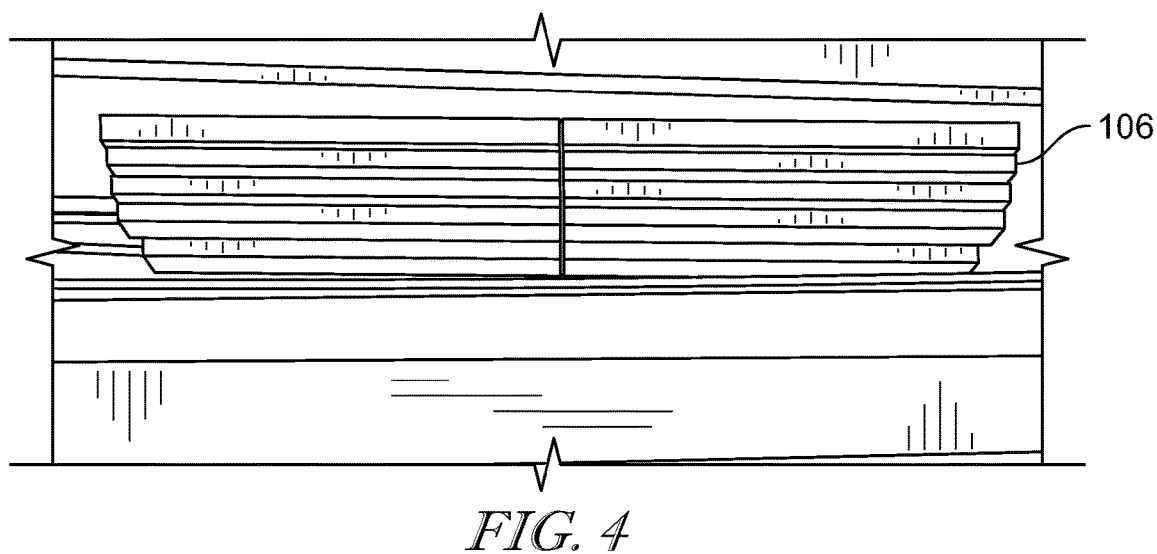
FIG. 4 is a perspective view of an armrest showing location and orientation of the heat sinks within an armrest tunnel formed in the armrest.

FIG. 2 illustrates occupant armrest 100 comprising a cover or trim material 116, an aluminum sheet 114, a conductive layer 118, at least one thermoelectric module 102, at least one heat sink 106, and an armrest substrate 120 connected to the armrest tunnel 130. The cover or trim material 116 may be comprised of any suitable material, including cloth or leather. The aluminum sheet 114 may be comprised of any other metallic material. The conductive layer 118 may be comprised of any conductive material, including but not limited to, graphene, graphite, and copper, combinations thereof, or any other suitable alternative. The heat sink 106 may be one piece or many pieces, and may take any suitable form, including the form of fins or tubes.

The occupant armrest 100 is adapted for use with an occupant support 110 in a vehicle as suggested in FIG. 1. The occupant armrest 100 includes the substrate 120, the cover 116, and a thermoelectric unit 136 as shown in FIGS. 1 and 2. Reference is hereby made to U.S. application Ser. No. 15/787,161, filed Oct. 18, 2017 for disclosure relating to thermoelectric units in accordance with the present disclosure, the application being hereby incorporated by reference in its entirety herein.

The substrate 120 is configured to support an arm of the occupant 112 of the vehicle as suggested in FIG. 1. The cover 116 is arranged about the substrate 120. The thermoelectric unit 136 is located between the substrate 120 and the cover 116 and is configured to selectively heat and cool the arm of the occupant 112 with conductive heat transfer through the cover 116. In some embodiments, the occupant armrest 100 further includes the temperature control system 122. The substrate 120 includes a rigid frame 140 and a cushion 142 that extends about the rigid frame 140 in the illustrative embodiment as shown in FIG. 2.

The cover 116 may include upholstery such as cloth or leather, for example. The cover 116 may be perforated to allow moisture to vent through the cover 116.

Figure 5:
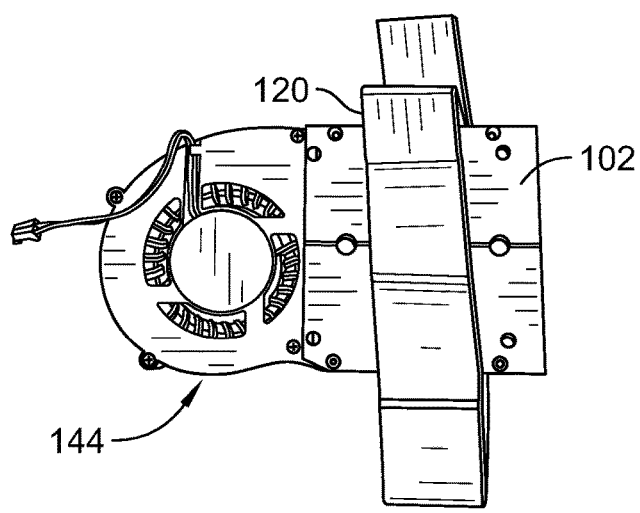
FIG. 5 is perspective view showing a heat sink with respect to the armrest upper plate sample.
Figure 6:
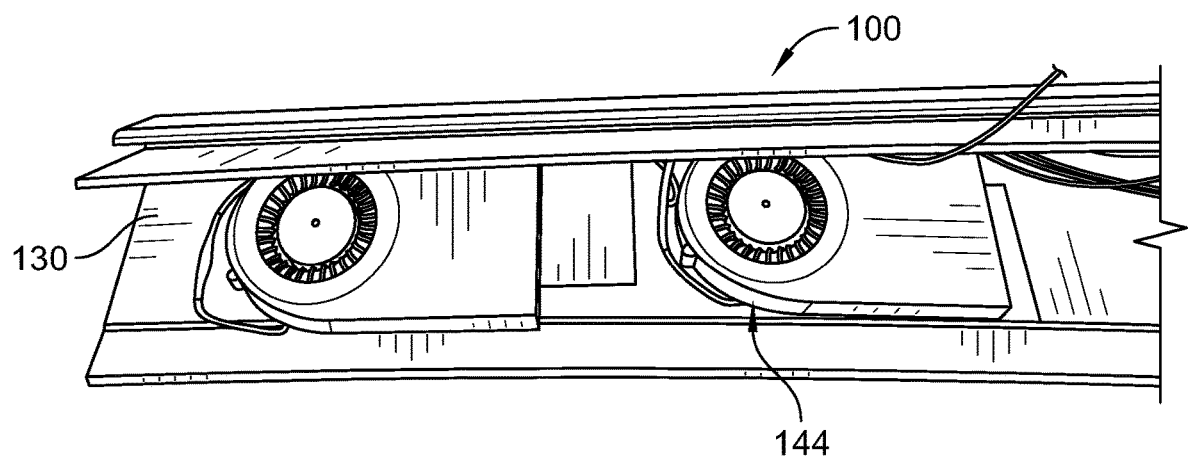
FIG. 6 is perspective view of a single armrest having two thermoelectric devices.
Figure 7:
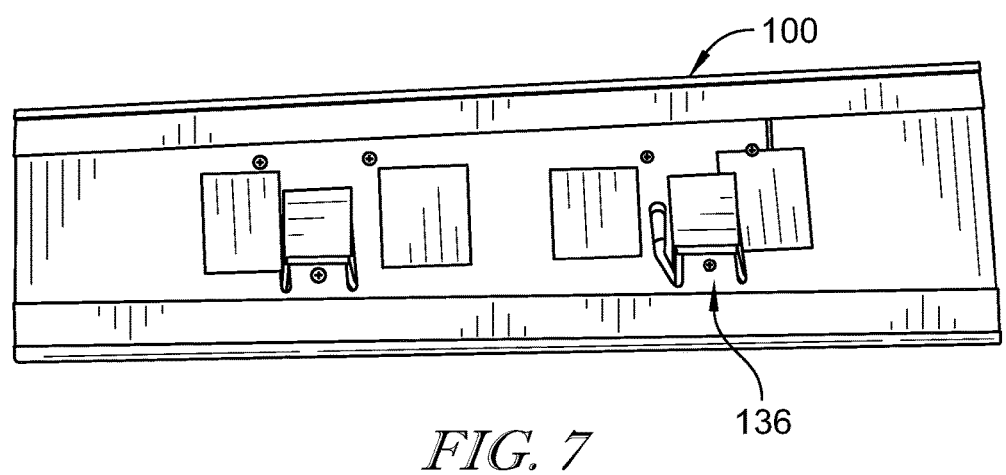
FIG. 7 is a top view of two thermoelectric module locations with respect to the armrest substrate.
Figure 8:
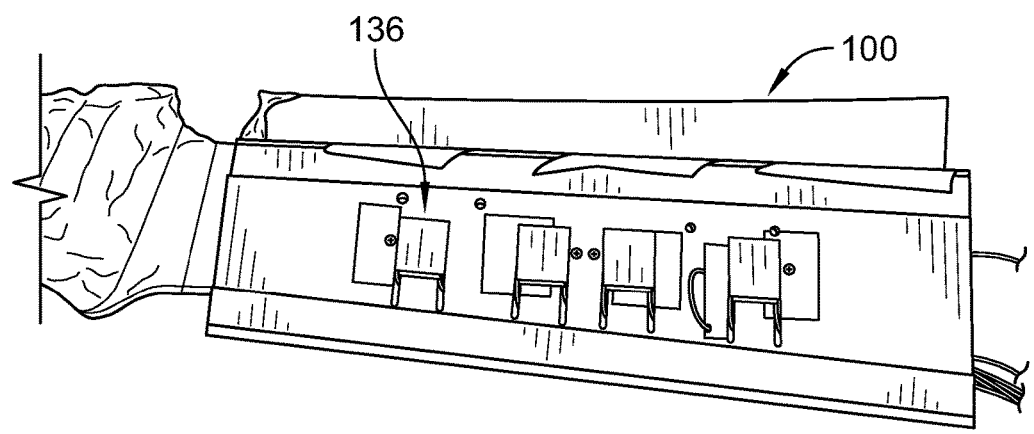
FIG. 8 is a top view of four thermoelectric module locations with respect to the armrest substrate.
Figure 9:
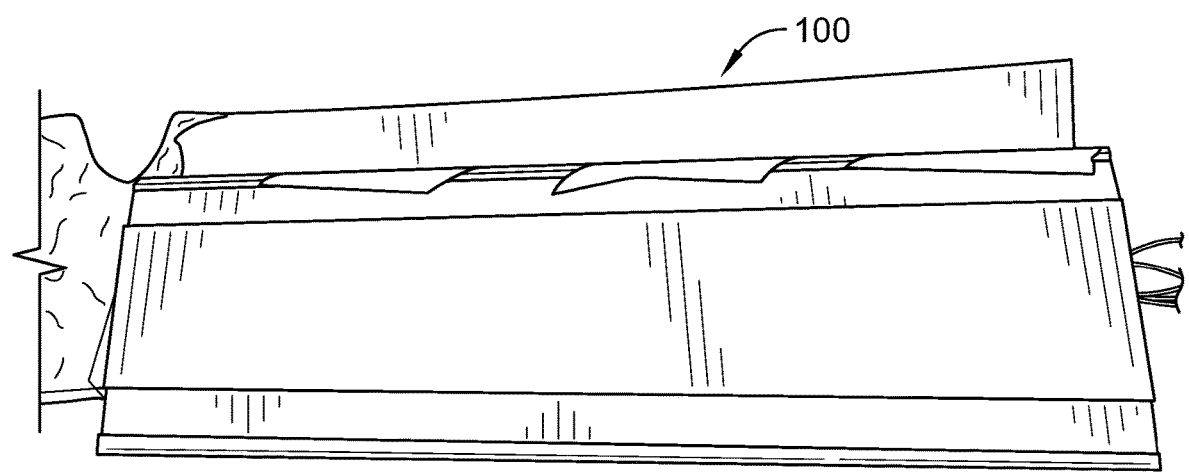
FIG. 9 is a perspective view of an armrest according to the present disclosure.

The thermoelectric unit 136 includes one or more thermoelectric modules 102, a thermal-transfer layer 114, a conductive layer 118, the blower 144, and the heat sink 106 as shown in FIGS. 2 and 5. The thermoelectric module 102 is configured to transfer selectively heat between a first side and a second side of the thermoelectric module 102 so that one of the first side and the second side is heated and the other of the first side and the second side is cooled relative to ambient conditions. The thermal-transfer layer 114 is located between the cover 116 and the thermoelectric module 102 to facilitate heat transfer between the arm of the occupant 112 and the thermoelectric module 102. In other embodiments, any one or more of the thermal-transfer layer 114, conductive layer 118, blower 144, and heat sink 106 may be omitted from the thermoelectric unit 136.

The thermoelectric module 102 is located between the thermal-transfer layer 114 and the heat sink 106 in the illustrative embodiment as shown in FIG. 2. The conductive layer 118 may be located between the thermal-transfer layer 114 and the thermoelectric module 102 as shown in FIG. 2. The conductive layer 118 may be in direct contact with the cover 116. The conductive layer comprises carbon based material in illustrative embodiments. In some embodiments, the conductive layer 118 comprises graphene. In some embodiments, the conductive layer 118 comprises graphite. The thermal-transfer layer 114 comprises metallic materials such as, for example, copper or aluminum.

Figure 10:
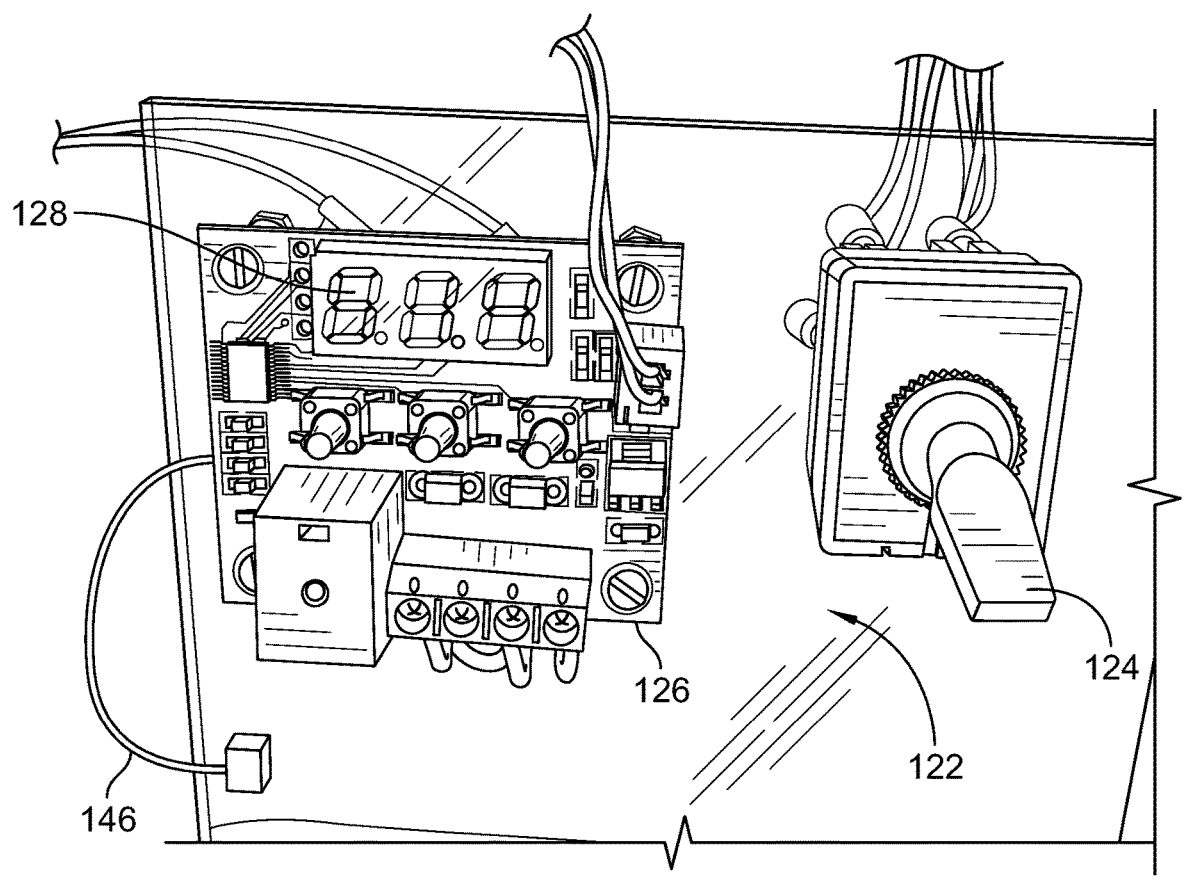
FIG. 10 is a perspective view showing a three-position toggle switch for use with the armrest of FIGS. 1 and 2 the three-position toggle switch is for cool, heat, and off positions.

The temperature control system 122 includes the controller 126 (sometimes called circuitry), the temperature control switch 124, and a temperature sensor 146 as shown in FIG. 10. The controller 126 is configured to vary power to the thermoelectric module 102. The temperature control switch 124 is configured to activate the controller 126 in some embodiments. The temperature sensor 146 is connected to the controller 126 and configured to sense a temperature of at least one of the arm of the occupant 112 and the thermoelectric unit 136.

In some embodiments, the temperature sensor 146 is coupled to the conductive layer 118. In some embodiments, the temperature sensor 146 is coupled to the thermal-transfer layer 114. In some embodiments, the temperature sensor 146 is coupled to the thermoelectric module 102.

The control system 122 is configured to receive arm-temperature signals indicative of a temperature of the arm of the occupant 112. The control system 122 is configured to compare the arm-temperature signals to preset signals indicative of a desired temperature. The control system 122 is configured to adjust power to the thermoelectric unit 136 based on a difference between the arm-temperature signals and the preset signals. In particular, the temperature sensor 146 may be configured to generate arm-temperature signals indicative of a temperature of the arm of the occupant 112 supported on the armrest 100. The controller 126 is configured to compare the arm-temperature signals to preset signals indicative of a desired temperature and to adjust the power to the thermoelectric module 102 based on a difference between the arm-temperature signals and the preset signals. The controller 126 may be configured to receive user input to set the desired temperature.

The control system 122 is configured to receive signals indicative of the temperature of the thermoelectric unit 136 and to vary power to the thermoelectric unit 136 if the temperature of the thermoelectric unit 136 is greater than a predetermined threshold temperature. In particular, the temperature sensor 146 may be configured to generate temperature signals indicative of a temperature of the thermoelectric unit 136. The controller 126 may be configured to compare the temperature signals with predetermined temperature signals indicative of a predetermined threshold temperature and to remove power to the thermoelectric unit 136 if the temperature of the thermoelectric unit is greater than the predetermined threshold temperature.

The switch 124 has an off position, a heat position, and a cool position in some embodiments. In the off position, electric current is blocked from being directed to the thermoelectric module 102. In the heat position, electric current having a first polarity is directed to the thermoelectric module 102. In the cool position, electric current having a second polarity different than the first polarity is directed to the thermoelectric module 102.

The thermoelectric unit 136 provides to occupant 112 a cold sensation when thermoelectric unit 136 is in the cooling mode and a warming sensation when thermoelectric unit 136 is in the heating mode in response to an input. Input may be a user input and/or an automatic input. The thermoelectric unit 136 provides means for moving heat between thermoelectric unit 136 and occupant 112 without convective heat transfer. The thermoelectric unit 136 may include graphene strips, thermoelectric module 102, heat sink, and a blower unit to exhaust heat generated when thermoelectric unit 136 is in the cooling mode. The thermoelectric module 136 is configured to generate heating or cooling for occupant 112 according to a polarity of an applied electric voltage. The blower is configured to couple to a side or underneath the heat sink.

The thermoelectric module 102 comprises a Peltier device in the illustrative example. The thermoelectric device 102 may be a solid state device. In some embodiments, thermoelectric device 102 may include P and N couples that are spaced further apart to increase a size of thermoelectric device 102. As a result, the area of contact with thermally-conductive layers would increase. The thermoelectric device 102 has a generally square surface area as suggested in FIG. 1. The thermal-transfer layer 114 and conductive layer 118 spread heat flow over a wider area than thermoelectric module 102 to provide a large area of contact.

In some such embodiments, a thermal transfer block may be coupled with the thermoelectric module 102. The thermal transfer block may comprise thermally-conductive material. In some embodiments, the thermal transfer block comprises aluminum alloy or any other suitable thermally-conductive material. In other embodiments, the thermal transfer block comprises other suitable thermally conductive material such as, for example, copper and carbon based materials. In some embodiments, the thermal transfer block is hourglass shaped.

A thermally conductive strip such as thermal-transfer layer 114 or conductive layer 118 may be thermally connected to thermal transfer block or thermoelectric module 102. The thermally conductive strip may extend outwardly away from the thermoelectric module 102 to provide heating and cooling to a greater surface area than that of a heating and cooling surface area of thermoelectric module 102. The thermally conductive strip may be flexible and configured to deform to form to a contour of the occupant 112.

The thermally-conductive strip may include a first arm, a second arm, and an intermediate portion. The thermoelectric module 102 may be coupled to the intermediate portion. The first arm of the thermally conductive strip extends away from the thermoelectric module 102 in a first direction and the second arm extends away from the thermoelectric module 102 in a second direction.

The conductive layer 118 and/or thermal-transfer layer 114 may comprises a plurality of layers of graphene. In some embodiments, the conductive layer 118 may include an outer layer of polyethylene. In some embodiments, each layer of graphene is coated in polymeric material such as, for example, polyethylene. In other embodiments, the layers of graphene form a graphite strip.

In other embodiments, thermal-transfer layer 114 and/or conductive layer 118 may include one or more of copper sheets, copper woven material, thermally conductive polymers, carbon based conductive materials such as, for example, carbon fiber fabric or graphite fabrics, woven pyrolytic graphite mat, and graphene nanoplatelet sheets. In some embodiments, the thermal-transfer layer 114 and/or conductive layer 118 is formed to include apertures therein to allow moisture and air to pass through. In some embodiments, sides of the layers 114, 118 are scalloped.

Thermally-conductive material for use with thermal-transfer layer 114 and conductive layer 118 has relatively high thermal conductivity properties and may be carbon based. One such example is graphene, for spreading temperature out over the cover. Graphene is an allotrope of carbon and it includes single sheets of graphite. To increase the lifetime of the graphene sheet, provide continuously support to keep high thermal conductivity, and to provide abrasion resistance, an additional thin plastic sheet layer may be added to the graphene to exhibit greater strength and resistance to ongoing stress and strain from occupant 112 getting in and out of the vehicle. Carbon-based materials promote heat transfer and heat distribution directly to an entire surface area of the conductive material, reducing the need to reinforce heat distribution. Heat may be transferred through the cover to the occupant 112 through a combination of conductive and radiative heat transfer to provide warming sensation to the occupant 112.

The invention claimed is:

1. An occupant armrest for use with an occupant support in a vehicle, the occupant armrest comprising
   a substrate configured to support an arm of an occupant of a vehicle, the substrate including a rigid frame and a cushion that extends about the rigid frame,
   a cover arranged about the substrate, and
   a thermoelectric unit located between the substrate and the cover, the thermoelectric unit configured to selectively heat and cool the arm of the occupant with conductive heat transfer through the cover, the thermoelectric unit includes a thermoelectric module and a thermal-transfer layer, the thermoelectric module configured to transfer selectively heat between a first side and a second side of the thermoelectric module so that one of the first side and the second side is heated and the other of the first side and the second side is cooled relative to ambient conditions, and the thermal-transfer layer located between the cover and the thermoelectric module to facilitate heat transfer between the arm of the occupant and the thermoelectric module.

2. The occupant armrest of claim 1, further comprising a control system that includes a controller configured to vary power to the thermoelectric unit, a temperature control switch configured to activate the controller, and a temperature sensor connected to the controller and configured to sense a temperature of at least one of the arm of the occupant and the thermoelectric unit.

3. The occupant armrest of claim 2, wherein the temperature sensor is configured to generate arm-temperature signals indicative of a temperature of the arm of the occupant supported on the armrest and the controller is configured to compare the arm-temperature signals to preset signals indicative of a desired temperature and to adjust the power to the thermoelectric module based on a difference between the arm-temperature signals and the preset signals.

4. The occupant armrest of claim 3, wherein the controller is configured to receive user input to set the desired temperature.

5. The occupant armrest of claim 2, wherein the temperature sensor is coupled to the thermoelectric unit and configured to generate temperature signals indicative of a temperature of the thermoelectric unit and the controller is configured to compare the temperature signals with predetermined temperature signals indicative of a predetermined threshold temperature and to remove power to the thermoelectric unit if the temperature of the thermoelectric unit is greater than the predetermined threshold temperature.

6. The occupant armrest of claim 1, wherein the thermoelectric unit includes a blower fan and a heat sink and the thermoelectric module is located between the thermal-transfer layer and the heat sink.

7. The occupant armrest of claim 6, wherein the thermoelectric unit includes a conductive layer located between the thermal-transfer layer and the thermoelectric module.

8. The occupant armrest of claim 7, wherein the conductive layer comprises carbon based material.

9. The occupant armrest of claim 8, wherein the thermal-transfer layer comprises metallic materials.

10. The occupant armrest of claim 1, wherein the thermoelectric unit includes a conductive layer that comprises graphene.

11. The occupant armrest of claim 1, wherein the thermoelectric unit includes a conductive layer that comprises graphite.

12. An occupant armrest for use with an occupant support in a vehicle, the occupant armrest comprising a substrate configured to support an arm of an occupant of a vehicle,
a cover coupled with the substrate, and
a thermoelectric unit located between the substrate and the cover and the thermoelectric unit configured to selectively heat and cool the arm of the occupant with conductive heat transfer through the cover,
wherein the thermoelectric unit includes a thermoelectric module configured to transfer selectively heat between a first side and a second side of the thermoelectric module so that one of the first side and the second side is heated and the other of the first side and the second side is cooled.

13. The occupant armrest of claim 12, wherein the thermoelectric unit includes a conductive layer located between the cover and the thermoelectric module.

14. The occupant armrest of claim 13, wherein the conductive layer is located between the thermoelectric module and a thermal-transfer layer.

15. The occupant armrest of claim 14, wherein the conductive layer comprises carbon based material and the thermal-transfer layer comprises metallic materials.

16. The occupant armrest of claim 12, further comprising a control system configured to receive signals indicative of a temperature of the thermoelectric unit and to vary power to the thermoelectric unit if the temperature of the thermoelectric unit is greater than a predetermined threshold temperature.

17. The occupant armrest of claim 12, further comprising a control system configured to receive arm-temperature signals indicative of a temperature of the arm of the occupant, to compare the arm-temperature signals to preset signals indicative of a desired temperature, and to adjust power to the thermoelectric unit based on a difference between the arm-temperature signals and the preset signals.

18. The occupant armrest of claim 12, further comprising a toggle switch having an off position in which electric current is blocked from being directed to the thermoelectric module, a heat position in which electric current having a first polarity is directed to the thermoelectric module, and a cool position in which electric current having a second polarity different than the first polarity is directed to the thermoelectric module.

19. The occupant armrest of claim 1, wherein thermal-transfer layer includes a thermally conductive strip and the thermally conductive strip is flexible and configured to deform to form to a contour of the occupant.

20. The occupant armrest of claim 14, wherein thermal-transfer layer includes a thermally conductive strip and the thermally conductive strip is flexible and configured to deform to form to a contour of the occupant.

* * * * *